United States Patent

Travis

[11] Patent Number: 6,019,161
[45] Date of Patent: Feb. 1, 2000

[54] ALL TERRAIN VEHICLE RADIATOR AIR FLOW ENHANCING ASSEMBLY

[76] Inventor: Scott D. Travis, 118 Pioneer, Mulvane, Kans. 67110

[21] Appl. No.: 09/153,120

[22] Filed: Sep. 15, 1998

[51] Int. Cl.[7] .................................................. F01P 7/02
[52] U.S. Cl. ............................... 165/41; 165/41; 165/98; 180/68.1; 180/229
[58] Field of Search ................... 165/98, 44, 41; 123/41.61, 41.6, 41.48; 180/68.1, 229

[56] References Cited

U.S. PATENT DOCUMENTS

| | | | |
|---|---|---|---|
| 1,298,094 | 3/1919 | Rishel | 165/98 |
| 1,402,651 | 1/1922 | Porter | 165/98 |
| 1,917,043 | 7/1933 | Lewis | 165/98 |
| 1,981,424 | 6/1934 | Lake | 165/41 |
| 2,162,526 | 6/1939 | Buick | 165/44 |
| 2,216,111 | 10/1940 | Huet | 165/44 |
| 2,280,642 | 4/1942 | Agerell et al. | 165/98 |
| 4,604,974 | 8/1986 | Watanabe | 123/41.01 |
| 4,709,774 | 12/1987 | Saito et al. | 180/229 |

*Primary Examiner*—Ira S. Lazarus
*Assistant Examiner*—Tho Duong
*Attorney, Agent, or Firm*—Kenneth H. Jack

[57] ABSTRACT

An air flow directing assembly for direction and concentration of air through the radiator of an all terrain vehicle, the air flow directing assembly consisting of a radiator shroud having an upper side, a right side, a left side, a forward end, and having a plurality of inwardly facing surfaces; an air dam fixedly attached to and extending inwardly from the inwardly facing surfaces of the radiator shroud; a right air deflecting fin fixedly attached to and extending forwardly and rightwardly from the forward end of the right side of the radiator shroud; and, a left air deflecting fin fixedly attached to and extending forwardly and leftwardly from the forward end of the left side of the radiator shroud.

10 Claims, 3 Drawing Sheets

ALL TERRAIN VEHICLE RADIATOR AIR FLOW ENHANCING ASSEMBLY

FIELD OF THE INVENTION

This invention relates to all terrain vehicles.

Particularly, this invention relates to liquid coolant radiator systems of all terrain vehicles. More particularly, this invention relates to apparatus and assemblies adapted for enhancing the flow of air through such radiators.

BACKGROUND OF THE INVENTION

Four wheel recreational all terrain vehicles commonly are powered by a two cycle internal combustion engine having a liquid cooling system. Such liquid cooling systems typically include a network of liquid coolant carrying tubes which carry heated fluid from the engine to a metal finned radiator for efficient heat dissipation. Considerations of space, safety and economy in the fabrication of such all terrain vehicles has led to installation of such radiators at a position in front of the handlebars and above the front wheels of the all terrain vehicle.

To protect the radiator and persons who may come into contact with the forward end of the all terrain vehicle, such radiators commonly are housed within a protective plastic radiator shroud which opens forwardly and rearwardly. The forward facing surface of a radiator exposed within the forward opening of such radiator shroud commonly is further protected by an air permeable grill. Typically, a gap exists between the side and upper surfaces of the radiator and the inner surfaces of the side walls and upper wall of the radiator shroud. A typical water cooled all terrain vehicle engine has no radiator fan.

A problem created by the above noted radiator and radiator shroud configuration is excessive engine heat. Air flow through the radiator shroud is hampered to some extent by the air permeable grill. Further, air which passes through the radiator shroud and between the outer edges of the radiator and the inner peripheral surface of the radiator shroud has little cooling effect upon fluid flowing within the radiator. Also, the lack of a radiator fan dramatically reduces the cooling efficiency of the radiator at low and moderate vehicle speeds.

The instant inventive assembly provides a solution to the above problems and deficiencies by causing the radiator shroud to serve as a support structure for a pair of air directing and concentrating fins which work upon the air in combination with an air dam. The air directing and concentrating fins effectively widen the forward opening of the radiator shroud, providing an air scoop effect, while the air dam prevents the air from passing between the inner surfaces of the radiator shroud and the outer peripheral surfaces of the radiator. Through combined utilization of such fins and air dam, the cooling efficiency of all terrain vehicle radiators is enhanced, preventing engine over-heating.

BRIEF SUMMARY OF THE INVENTION

The instant inventive all terrain vehicle radiator air flow enhancing assembly preferably comprises a plastic injection molded radiator shroud having a pair of side walls and an upper wall spanning there between; the interior dimensions of the radiator shroud being greater than the exterior dimensions of an all terrain vehicle radiator which it enshrouds. Commonly, such a radiator shroud may be obtained as a standard equipment component of a manufactured recreational all terrain vehicle.

An inverted U-shaped air dam preferably is fixedly mounted within the interior space of the radiator shroud, the air dam extending inwardly from the inner surfaces of the air dam. Preferably, the outer edges of the air dam are closely fitted to underlie the inner peripheral surfaces of the radiator shroud. Also preferably, the inwardly facing edges of the air dam are fitted to closely overlie the outer edges of the forward end of the radiator. Upon attachment of the air dam to the radiator shroud, and upon mounting of the radiator shroud over the radiator, the air dam spans between the gap between the inner surfaces of the radiator shroud and the peripheral sides of the radiator, blocking or damming air flow there between.

Preferably, a pair of air deflecting and concentrating fins are fixedly attached to the left and right sides of the forward end of the radiator shroud, the right fin preferably extending forwardly and rightwardly, and the left fin preferably extending forwardly and leftwardly. Such extension and positioning of the air deflecting fins allows such fins to scoop additional air into and through the radiator shroud. Absent such fins, such additional air would uselessly pass outside of the shroud. The additional air directed into the radiator shroud is then further directed through the radiator by the air dam. Thus, through combined utilization of the air deflecting and concentration fins and the air dam, air flow through the radiator shroud and through the radiator is enhanced, enhancing the engine cooling efficiency of the radiator.

Preferably, an air permeable protective grill spans across the forward opening of the radiator shroud. Also preferably, the air deflecting and concentrating fins are composed of sheet steel or sheet aluminum. Also preferably, the fins and the air dam are fixedly attached to the radiator shroud by means of spirally threaded screws which extend into and are lodged within screw receiving apertures.

Accordingly, it is an object of the present invention to provide an all terrain vehicle radiator air flow enhancing assembly including a radiator shroud, such assembly providing a pair of air deflecting and concentrating fins for directing additional air through the radiator.

It is further object of the present invention to provide such an assembly which further provides an air dam spanning between an air gap between the side surfaces of the radiator and the inner surfaces of the radiator shroud, such air dam further directing air through the radiator.

It is further object of the present invention to provide such an assembly which is easily and efficiently constructed.

It is a further object of the present invention to provide such an assembly which is economically constructed.

Other and further objects, benefits, and advantages of the present inventive assembly will become known to those skilled in the art upon review of the Detailed Description which follows and upon review of the appended drawings.

BRIEF DESCRIPTION OF THE DRAWINGS

Drawing

DETAILED DESCRIPTION OF THE PREFERRED EMBODIMENT

Figure 1:
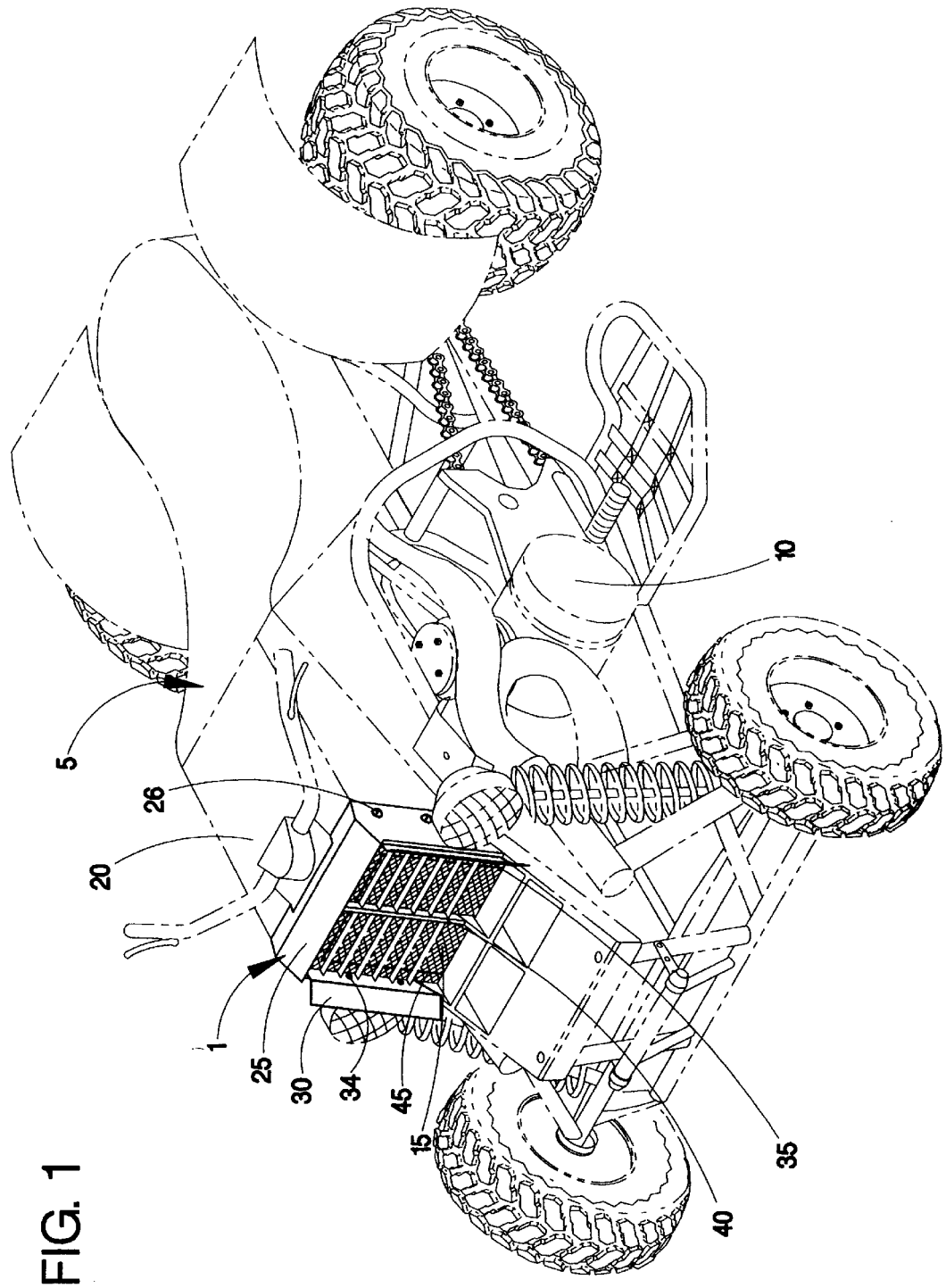
FIG. 1 is an isometric view of the present inventive assembly for directing and concentrating a flow of air, the view showing a common recreational all terrain vehicle in ghost.

Referring now to the drawings, and in particular to Drawing FIG. 1, the present inventive all terrain vehicle radiator air flow enhancing assembly is referred to generally by Drawing Element 1. A recreational all terrain vehicle, referred to generally by Drawing Element 5 typically has a liquid cooled two cycle engine which includes a radiator 15. A radiator shroud 25 having an upper wall and a pair of side walls is preferably fixedly attached to the molded body of the all terrain vehicle 5 by means of, referring simultaneously to FIGS. 1 and 2, screws 26 which extend through screw receiving apertures 27 and 28.

Figure 2:
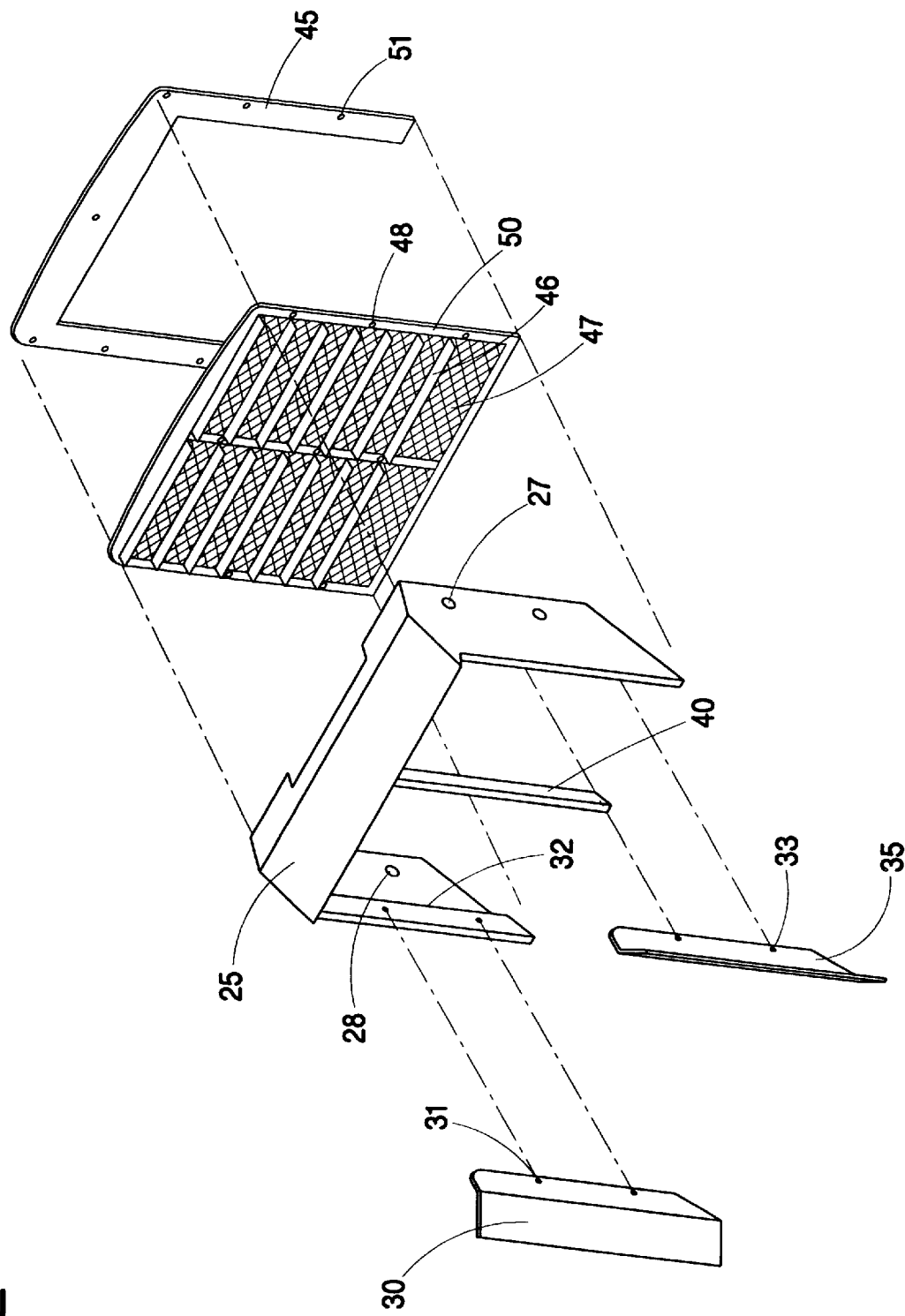
FIG. 2 is an isometric exploded view of the present inventive assembly.
Figure 3:
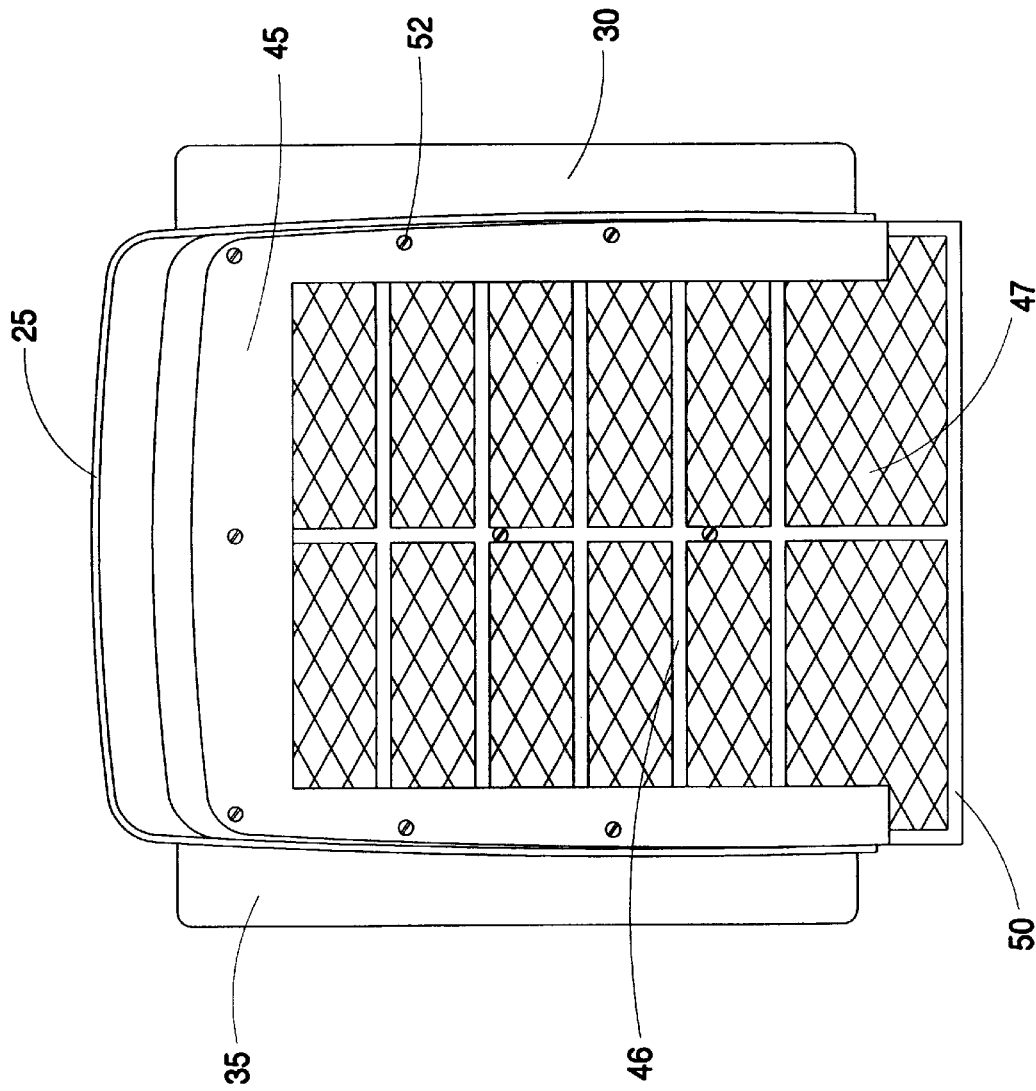
FIG. 3 is a plan view of the inner surfaces of the present inventive assembly.

Referring again to FIG. 1, the lateral and vertical dimensions of the radiator 15 fall short of the interior lateral and vertical dimensions of the upper and side walls of the radiator shroud 25, leaving an air gap surrounding the radiator 15. Referring simultaneously to FIGS. 2 and 3, air flow through said air gap is preferably blocked by a U-shaped air dam 45, such air dam 45 being fixedly attached to the radiator shroud 25 by means of spirally threaded screws 52 which extend through screw receiving apertures 51. The screws 52 which extend through the screw receiving apertures 51 further extend through screw receiving apertures 48 of a protective grill 50, such screws 52 lodging within flanges 32 and a center support 40 for secure mounting upon the radiator shroud 25. Preferably, the grill 50 has a plurality of reinforcing air directing fins 46 and a wire or plastic mesh 47, preventing insects and debris from fouling the fins of the radiator 15.

Referring again to FIG. 1, a pair of air deflecting and concentrating fins 30 and 35 extend forwardly and respectively rightwardly and leftwardly from the right and left side walls of the radiator shroud 25, each air deflecting fin 30 and 35 having a substantially planar air deflecting surface. Referring simultaneously to FIGS. 1 and 2, the air deflecting and concentrating fins 30 and 35 are preferably mounted upon the radiator shroud 25 by means of spirally threaded screws 34 which extend through screw receiving apertures 31 and 33 within the air deflecting and concentrating fins 30 and 35, said screws 34 further extending into screw receiving apertures 32 within the side walls of the radiator shroud 25.

Referring to FIG. 3, it can be seen that the area defined by the forward and upper edges of the air deflecting and concentrating fins 35 and 30 is substantially greater than the area defined by the inner edges of the air dam 45. Said differential in area represents a positive differential in air volume which the present inventive assembly is capable of transmitting through a radiator. Preferably, the area defined by the inner edges of the air dam 45 matches the exterior profile of the radiator 15 of the all terrain vehicle.

In operation of the invention, referring simultaneously to FIGS. 1 and 3, as the all terrain vehicle 5 moves forwardly, the air deflecting and concentrating fins 30 and 35 are simultaneously driven forwardly through the air. The angular planar surfaces of the fins 30 and 35 impinge upon the air, directing and driving the air inwardly toward the grill covered opening of the radiator shroud 25. A large portion of the air thus entering the radiator shroud 25 will pass directly into the radiator 15. Referring simultaneously to Drawing FIGS. 1 and 2, the portion of the air directed toward the periphery of the radiator 15 will impinge upon the forwardly facing surfaces of the air dam 45 rather than passing across the side walls of the radiator 15. Thus, through utilization of the combination of the air deflecting and concentrating fins 30 and 35 and the air dam 45, a substantial additional volume of air may be driven through the radiator 15, which air would otherwise uselessly pass outside of the radiator shroud 25 or between the inner surfaces of the radiator shroud 25 and the outer surfaces of the radiator 15. Enhancement of the volume of air flow through the radiator enhances the radiator's cooling efficiency, preventing engine overheating.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An air flow directing assembly for direction and concentration of air through the radiator of an all terrain vehicle, the air flow directing assembly comprising:

(a) a radiator shroud having an upper side, a right side, a left side, a forward end, and having a plurality of inwardly facing surfaces;

(b) an air dam fixedly attached to and extending inwardly from the inwardly facing surfaces of the radiator shroud;

(c) a right air deflecting fin fixedly attached to and extending forwardly and rightwardly from the forward end of the right side of the radiator shroud; and, (d) a left air deflecting fin fixedly attached to and extending forwardly and leftwardly from the forward end of the left side of the radiator shroud.

2. The air flow directing assembly of claim 1 wherein the upper, right, and left sides of the radiator shroud comprise an upper wall and a pair of walls, the side walls extending downwardly from the upper wall.

3. The air flow directing assembly of claim 2 wherein the air dam comprises a fourth wall having an air flow aperture therethrough, the air flow aperture being fitted for concentration of a flow of air passing through the radiator shroud.

4. The air flow directing assembly of claim 3 wherein each of the left and right air deflecting fins have a substantially planar air deflecting surface, the air deflecting surfaces of the left and right air deflecting fins being positioned so that upon forward motion of the air flow directing assembly through air, such air is diverted to positions between the inwardly facing surfaces of the radiator shroud.

5. The air flow directing assembly of claim 4 further comprising an air permeable grill fixedly attached to and spanning between the forward ends of the inwardly facing surfaces of the radiator shroud.

6. The air flow directing assembly of claim 5 wherein the air dam has a plurality of outer edges and a plurality of inner edges, the outer edges being fitted and positioned for mounting upon the inwardly facing surfaces of the radiator shroud, and the inner edges being fitted and positioned to overlie a plurality of outer peripheral surface of an all terrain vehicle radiator, the inner edges of the air dam defining the air flow aperture.

7. The air flow directing assembly of claim 6 wherein the left and right air deflecting fins comprise a pair of oblongated metal plates.

8. The air flow directing assembly of claim 7 wherein the radiator shroud is composed of a material comprising injection molded plastic.

9. The air flow directing assembly of claim 8 wherein the fixed attachment of the air dam to the radiator shroud comprises a plurality of spirally threaded screws extending through a plurality of screw receiving apertures.

10. The air flow directing assembly of claim 9 wherein the fixed attachments of the left and right air deflecting fins to the radiator shroud comprise a second plurality of spirally threaded screws extending through a second plurality of screw receiving apertures.

* * * * *